Patented Oct. 9, 1923.

1,469,813

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing.     Application filed April 5, 1921.   Serial No. 458,743.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patents No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in the lower monohydroxy aliphatic alcohols or in methyl benzoate, it has been found that such single solvents by themselves will not dissolve a sufficient proportion of the ethers to make a desirably thick flowable composition or dope, such as may be used in the manufacture of photographic film base by the customary methods, and in the other plastic arts.

I have discovered that an adequately strong and useful solvent may be prepared by mixing methyl benzoate with one or more of the lower monohydroxy aliphatic alcohols. By the latter term I include the members containing less than six carbon atoms while they may be mixed in varying proportions, it is noted, by way of example, that a useful solvent can be formed by mixing 50 to 90 parts by weight of methyl benzoate and 50 to 10 parts of ethyl alcohol or methyl alcohol, or a mixture of such alcohols. The amount of ether dissolved in the solvent can be varied to suit the needs of the manufacturer, but, for purposes of illustration, it is noted that a useful viscous flowable solution may be obtained by dissolving 1 part of water-insoluble ethyl cellulose in 5 parts by weight of such compound solvents. Other substances which impart additional suppleness, or incombustibility, or other qualities, to the film may then be added to the dope, such, for instance, as triphenyl or tricresyl phosphate, camphor, etc. Due to its relatively low volatility, considerable amounts of the methyl benzoate remain in the film after evaporation of the more volatile alcohols. It imparts useful properties to the film. Since the ratio of the weight of methyl benzoate to the weight of the cellulose ether can be made much greater by the use of my compound solvent, instead of using methyl benzoate alone, it follows that a much greater proportion of methyl benzoate will be present in the finished film than when the cellulose ethers are dissolved in methyl benzoate as the sole solvent.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A viscous flowable film-forming composition, comprising an ether of cellulose dissolved in a mixture of methyl benzoate and a lower monohydroxy aliphatic alcohol.

2. A viscous flowable film-forming composition, comprising an alkyl ether of cellulose dissolved in a compound solvent containing approximately 50 to 90 parts by weight of methyl benzoate and 50 to 10 parts of methyl alcohol.

3. As an article of manufacture, a transparent flexible film comprising water-insoluble ethyl cellulose and methyl benzoate, the proportion of methyl benzoate corresponding to a solution of the said ethyl cellulose in a compound solvent of methyl benzoate and a lower monohydroxy aliphatic alcohol and exceeding the proportion corresponding to a solution of ethyl cellulose in methyl benzoate alone.

Signed at Rochester, New York, this 30th day of March, 1921.

STEWART J. CARROLL.